(12) United States Patent
Keener (10) Patent No.: US 8,474,759 B2
(45) Date of Patent: Jul. 2, 2013

(54) METHOD AND APPARATUS FOR FASTENING COMPONENTS USING A COMPOSITE TWO-PIECE FASTENING SYSTEM

(75) Inventor: Steven G. Keener, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 996 days.

(21) Appl. No.: 12/538,564

(22) Filed: Aug. 10, 2009

(65) Prior Publication Data
US 2010/0001137 A1   Jan. 7, 2010

Related U.S. Application Data

(62) Division of application No. 11/838,573, filed on Aug. 14, 2007, now Pat. No. 7,966,711.

(51) Int. Cl.
*B23P 11/00* (2006.01)

(52) U.S. Cl.
USPC .... 244/131; 29/897.2; 29/525.04; 29/525.12; 29/525.15; 29/243.5; 411/361

(58) Field of Classification Search
USPC ............. 29/897.2, 447, 458, 469.5, 525.02, 29/525.04, 525.11, 525.09, 525.12, 525.15, 29/243.5; 411/501, 361; 403/408.1; 244/131, 244/132
See application file for complete search history.

(56) References Cited

U.S. PATENT DOCUMENTS

| | | | |
|---|---|---|---|
| 2,099,678 A | 11/1937 | Curtis | |
| 2,365,372 A | 12/1944 | Allen | |
| 2,432,986 A | 12/1947 | Forman | |
| 2,493,452 A | 1/1950 | Grigg | |
| 2,510,693 A | 6/1950 | Green | |
| 2,525,736 A | 10/1950 | Taylor | |
| 2,887,003 A | 5/1959 | Brilmyer | |

(Continued)

FOREIGN PATENT DOCUMENTS

| EP | 0203748 A1 | 9/1986 |
|---|---|---|
| EP | 0203748 A1 | 12/1986 |

(Continued)

OTHER PUBLICATIONS

Debski et al., "Composite Joints of Aerostructures", Transactions of the Institute of Aviation, No. 170-171, 1999, pp. 3-27.

(Continued)

*Primary Examiner* — David Bryant
*Assistant Examiner* — Christopher Koehler
(74) *Attorney, Agent, or Firm* — Yee & Associates, P.C.

(57) ABSTRACT

A method and apparatus for attaching parts. A composite male fastening component is placed through at least a first part and a second part. The composite male fastener component preferably has a threaded portion. A composite female fastener component is positioned adjacent to and surrounding the threaded portion of the male fastener component. A portion of the composite female fastener component is caused to flow around and form into the threaded portion of the composite male fastener component. The portion of the composite female fastener component that flowed around and formed into the threaded portion of the composite male fastener component is re-solidified and re-consolidated such that the composite female fastener component is securely attached to the composite male fastener component thereby joining the mating parts.

16 Claims, 4 Drawing Sheets

U.S. PATENT DOCUMENTS

| | | | |
|---|---|---|---|
| 3,013,643 A | 12/1961 | Perry | |
| 3,014,563 A | 12/1961 | Bratton | |
| 3,085,461 A | 4/1963 | Forman | |
| 3,107,572 A | 10/1963 | Orloff | |
| 3,128,999 A | 4/1964 | Schmitt | |
| 3,193,237 A | 7/1965 | Adams | |
| 3,262,353 A | 7/1966 | Waeltz et al. | |
| 3,302,510 A | 2/1967 | Gapp | |
| 3,307,731 A | 3/1967 | Seltzer | |
| 3,343,581 A | 9/1967 | Martin et al. | |
| 3,345,901 A | 10/1967 | Brosseit | |
| 3,348,444 A | 10/1967 | Brignola | |
| 3,390,601 A | 7/1968 | Summerlin | |
| 3,411,957 A | 11/1968 | Takai et al. | |
| 3,489,312 A | 1/1970 | Hunckler et al. | |
| 3,535,136 A | 10/1970 | Beene | |
| 4,117,261 A | 9/1978 | Blevins et al. | |
| 4,127,345 A | 11/1978 | Angelosanto et al. | |
| 4,211,145 A | 7/1980 | Dolch | |
| 4,237,768 A | 12/1980 | Volkmann | |
| 4,312,613 A | 1/1982 | Binns | |
| 4,348,140 A | 9/1982 | Bergholz et al. | |
| 4,364,697 A | 12/1982 | Binns | |
| 4,405,256 A | 9/1983 | King, Jr. | |
| 4,414,011 A | 11/1983 | Layden et al. | |
| 4,451,189 A | 5/1984 | Pratt | |
| 4,457,652 A | 7/1984 | Pratt | |
| 4,478,543 A | 10/1984 | Lyon | |
| 4,478,544 A | 10/1984 | Strand | |
| 4,490,083 A | 12/1984 | Rebish | |
| 4,521,147 A | 6/1985 | King, Jr. et al. | |
| 4,542,056 A | 9/1985 | Anglin et al. | |
| 4,544,312 A | 10/1985 | Stencel | |
| 4,595,324 A | 6/1986 | Sadri | |
| 4,623,290 A * | 11/1986 | Kikuzawa et al. | 411/350 |
| 4,659,268 A | 4/1987 | Del Mundo et al. | |
| 4,681,497 A | 7/1987 | Berecz | |
| 4,687,394 A | 8/1987 | Berecz | |
| 4,687,395 A * | 8/1987 | Berecz et al. | 411/361 |
| 4,687,396 A | 8/1987 | Berecz | |
| 4,687,397 A | 8/1987 | Berecz | |
| 4,687,398 A | 8/1987 | Berecz | |
| 4,717,302 A | 1/1988 | Adams et al. | |
| 4,718,801 A | 1/1988 | Berecz | |
| 4,755,904 A | 7/1988 | Brick | |
| 4,761,871 A | 8/1988 | O'Connor et al. | |
| 4,767,248 A | 8/1988 | Pratt | |
| 4,778,637 A * | 10/1988 | Adams et al. | 264/136 |
| 4,815,906 A | 3/1989 | Binns | |
| 4,824,314 A | 4/1989 | Stencel | |
| 4,850,771 A | 7/1989 | Hurd | |
| 4,859,128 A | 8/1989 | Brecz et al. | |
| 4,861,211 A | 8/1989 | Dunsmore | |
| 4,863,330 A | 9/1989 | Olez et al. | |
| 4,865,792 A | 9/1989 | Moyer | |
| 4,877,362 A | 10/1989 | Berecz et al. | |
| 4,949,450 A | 8/1990 | Scharres | |
| 4,967,463 A | 11/1990 | Pratt | |
| 4,985,979 A | 1/1991 | Speakman | |
| 5,033,925 A * | 7/1991 | Moghe | 411/366.1 |
| 5,051,636 A | 9/1991 | Ishimoto et al. | |
| 5,066,179 A | 11/1991 | Pratt | |
| 5,080,547 A * | 1/1992 | Moghe | 411/436 |
| 5,090,857 A | 2/1992 | Dunn | |
| 5,092,727 A | 3/1992 | Moghe | |
| 5,098,240 A | 3/1992 | Gapp et al. | |
| 5,114,290 A | 5/1992 | Moghe | |
| 5,127,783 A * | 7/1992 | Moghe et al. | 411/411 |
| 5,152,650 A | 10/1992 | Kitagawa | |
| 5,153,978 A | 10/1992 | Simmons | |
| 5,195,855 A | 3/1993 | Atkinson et al. | |
| 5,238,342 A | 8/1993 | Stencel | |
| 5,253,962 A | 10/1993 | Close, Jr. | |
| 5,256,017 A | 10/1993 | Smirnov et al. | |
| 5,314,282 A | 5/1994 | Murphy et al. | |
| 5,350,264 A | 9/1994 | Stencel | |
| 5,354,160 A | 10/1994 | Pratt et al. | |
| 5,361,483 A | 11/1994 | Rainville et al. | |
| 5,498,110 A | 3/1996 | Stencel et al. | |
| 5,569,008 A | 10/1996 | Chapkovich | |
| 5,582,494 A | 12/1996 | Cook | |
| 5,614,037 A | 3/1997 | Keener | |
| 5,620,287 A | 4/1997 | Pratt | |
| 5,634,751 A | 6/1997 | Stencel et al. | |
| 5,680,690 A | 10/1997 | Briles et al. | |
| 5,810,530 A | 9/1998 | Travis | |
| 5,858,133 A | 1/1999 | Keener | |
| 5,860,780 A | 1/1999 | Lenac et al. | |
| 5,902,535 A | 5/1999 | Burgess et al. | |
| 5,922,472 A | 7/1999 | Keener | |
| 5,944,918 A | 8/1999 | Keener | |
| 5,947,667 A | 9/1999 | Cassatt et al. | |
| 6,023,891 A | 2/2000 | Robertson et al. | |
| 6,036,418 A | 3/2000 | Stencel et al. | |
| 6,042,315 A | 3/2000 | Miller et al. | |
| 6,171,649 B1 | 1/2001 | Keener et al. | |
| 6,221,177 B1 | 4/2001 | Keener | |
| 6,274,200 B1 | 8/2001 | Keener et al. | |
| 6,287,064 B1 | 9/2001 | Jhumra et al. | |
| 6,350,092 B1 | 2/2002 | Powell | |
| 6,403,230 B1 | 6/2002 | Keener | |
| 6,471,179 B1 | 10/2002 | Tousi et al. | |
| 6,494,972 B1 | 12/2002 | Keener et al. | |
| 6,499,926 B2 * | 12/2002 | Keener | 411/504 |
| 6,638,381 B2 | 10/2003 | Keener et al. | |
| 6,794,012 B2 | 9/2004 | Tsotsis | |
| 6,796,759 B2 | 9/2004 | Aasgaard | |
| 6,797,012 B2 | 9/2004 | Schulze zur Wiesche et al. | |
| 6,979,129 B2 | 12/2005 | Farbaniec et al. | |
| 6,986,929 B2 | 1/2006 | Tsotsis | |
| 7,076,864 B2 | 7/2006 | Malaka | |
| 7,150,594 B2 | 12/2006 | Keener | |
| 7,307,825 B2 | 12/2007 | De La Fuente De Ana et al. | |
| 7,351,022 B2 | 4/2008 | Denslow | |
| 7,599,164 B2 | 10/2009 | Heeter et al. | |
| 7,654,909 B2 | 2/2010 | Keener et al. | |
| 7,695,226 B2 | 4/2010 | March et al. | |
| 7,874,059 B2 | 1/2011 | Morrison et al. | |
| 7,896,599 B2 | 3/2011 | Stephen et al. | |
| 7,898,785 B2 | 3/2011 | Winter et al. | |
| 7,966,711 B2 | 6/2011 | Keener | |
| 7,969,706 B2 | 6/2011 | Heeter et al. | |
| 7,996,975 B1 | 8/2011 | Denslow | |
| 8,186,614 B2 | 5/2012 | Sanchez-Brunete Ivarez et al. | |
| 2002/0172576 A1 | 11/2002 | Keener | |
| 2004/0058122 A1 | 3/2004 | Tsotsis | |
| 2005/0115046 A1 | 6/2005 | Woods et al. | |
| 2005/0125985 A1 | 6/2005 | Adams et al. | |
| 2005/0201845 A1 | 9/2005 | Keener | |
| 2006/0062650 A1 | 3/2006 | Keener | |
| 2006/0243860 A1 | 11/2006 | Kismarton | |
| 2006/0292375 A1 | 12/2006 | Martin | |
| 2009/0029113 A1 | 1/2009 | Sanchez et al. | |
| 2009/0047100 A1 | 2/2009 | Keener | |
| 2009/0126180 A1 | 5/2009 | Keener | |
| 2010/0001137 A1 | 1/2010 | Keener | |
| 2010/0061031 A1 | 3/2010 | Lopez-Reina Torrijos et al. | |
| 2010/0219287 A1 | 9/2010 | Sanchez-Brunete Alvarez et al. | |
| 2010/0276055 A1 | 11/2010 | Martin | |
| 2010/0278616 A1 | 11/2010 | March et al. | |
| 2011/0001086 A1 | 1/2011 | Kruckenberg et al. | |

FOREIGN PATENT DOCUMENTS

| | | |
|---|---|---|
| EP | 0258477 | 3/1988 |
| EP | 0316056 A1 | 5/1989 |
| EP | 0392568 A1 | 10/1990 |
| EP | 2058111 | 5/2009 |
| GB | 2205374 A | 12/1988 |
| WO | 2005092517 A1 | 10/2005 |
| WO | WO2006036300 | 4/2006 |

OTHER PUBLICATIONS

EP Search report dated Sep. 22, 2011 regarding Application EP11178811, (7 pages).

USPTO Office Action, U.S. Appl. No. 11/935,949, dated Jul. 14, 2011.

EP Search Report dated Feb. 11, 2009 regarding application EP08253594, applicant's reference P103419EP00, applicant The Boeing Company, 8 pages.

USPTO Office Action dated May 18, 2006 regarding U.S. Appl. No. 10/945,120, 18 pages.

USPTO Office Action dated Dec. 19, 2005 regarding U.S. Appl. No. 10/945,120, 15 pages.

USPTO Final Office Action dated Oct. 6, 2009 regarding U.S. Appl. No. 11/838,573, 12 pages.

USPTO Office Action dated May 12, 2009 regarding U.S. Appl. No. 11/838,573, 13 pages.

USPTO Office Action dated Aug. 6, 2010 regarding U.S. Appl. No. 11/838,573, 5 pages.

USPTO Notice of Allowance dated Oct. 14, 2010 regarding U.S. Appl. No. 11/838,573, 4 pages.

USPTO Office Action dated Mar. 24, 2011 regarding U.S. Appl. No. 11/935,949, 18 pages.

USPTO Office Action dated Jan. 24, 2012 regarding U.S. Appl. No. 11/935,949, 13 pages.

USPTO Final Office Action dated Jun. 28, 2012 regarding U.S. Appl. No. 11/935,949, 11 pages.

Notice of allowance dated Nov. 5, 2012 regarding U.S. Appl. No. 11/935,949, 19 pages.

Chung, "Carbon Fiber Composites," published by Butterworth-Heinemann, copyright 1994, p. 97.

PCT search report dated Jan. 6, 2006 regarding PCT/US2005/027766, 3 pages.

* cited by examiner

METHOD AND APPARATUS FOR FASTENING COMPONENTS USING A COMPOSITE TWO-PIECE FASTENING SYSTEM

This application is a divisional of application Ser. No. 11/838,573, filed Aug. 14, 2007, and issued on Jun. 28, 2011 as U.S. Pat. No. 7,966,711.

BACKGROUND INFORMATION

1. Field

The present disclosure relates generally to composite components and in particular to a method and apparatus for manufacturing composite components. Still more particularly, the present invention relates to a method and apparatus for fastening composite components to each other using a composite fastening system.

2. Background

Aircraft are being designed and manufactured with greater and greater percentages of composite materials. Some aircraft may have more than fifty percent of their primary structure made from composite materials. Composite materials are being used in aircraft to decrease the weight of the aircraft. This decreased weight improves payload capacities and fuel efficiencies. Further, composite materials also may provide improved corrosion and fatigue resistance for various components in an aircraft thereby contributing to the overall improvement of the aircraft performance.

Composite materials are tough, light-weight materials created by combining two or more dissimilar components to create a component with stronger properties than the original materials. Composite materials are also typically non-metallic materials. In these examples, a composite is a multi-phase material, in which the phase distribution and geometry may have been controlled to optimize one or more properties.

One phase is typically continuous and referred to as a matrix. The matrix may be typically more compliant than other phases and may be tougher than other phases. This matrix typically supports and binds the reinforcement together and provides environmental protection for the reinforcement. The matrix may transmit the load from one piece of reinforcement to the other, usually by shear, and may carry shear stresses of the composite. Other phases may be distributed within the matrix and are often fibrous or particulates. These distributed phases are often stiffer and stronger than the matrix and may provide the composite with its high stiffness and strength properties. For example, a composite may include fibers and resins.

Fibers that may be found in composites include, for example, graphite, boron, high-tensile glass, ceramic, and aramid used in conjunction with polyester/vinyl-ester, epoxy, ceramic, and metal matrixes. The fibers and resins may be combined by curing or heating these constituents to form a cured material or product for the composite component.

In manufacturing aircraft, various two-piece metallic fastening systems have been long used for the assembly of aircraft structures and components of all types of metallic or non-metallic materials. Typically, metallic male fastener components are installed with mating metallic female fastener components to hold the parts together. The metallic male fastener components include, for example, threaded pins or lockbolts. The metallic female mating components may take the form of threaded collars, nuts, and/or swaged collars. Use of metallic components, however, increases the weight of the aircraft. Currently, the mechanical joining of non-metallic or composite aircraft components using metallic fasteners have been the excepted industry standard.

The use of non-metallic composite materials or even a hybrid of both metallic and non-metallic composite material components in mechanical fastener assemblies for joining non-metallic composite structural components to each other have been very limited or non-existent. The reasons for these limited uses include, for example, material property limitations, such as plastic deformation. The deformation aspects or considerations may include deformability in mating collars of two-piece systems such as lockbolts or threaded pins. Lower shear strength, galvanic corrosion, and limited compressive strength are examples of other factors that have limited the use of composite materials in fastener components.

Even with the use of large co-cured composite structures in aircraft construction, the joining of composite components using mechanical systems are still desirable especially for areas in the aircraft where the need for repair and/or replacement of the structural components is foreseen or unavoidable.

As a result, manufacturers still seek to improve fastening technology to increase levels of automation, ease of assembly, and cost and weight savings as well as other factors. Therefore, it would be advantageous to have improved fastening systems using composite materials to decrease the weight while improving the performance of the aircraft.

SUMMARY

The different advantageous embodiments of the present disclosure provide a method and apparatus for attaching parts. In one embodiment a method is provided for assembling a composite structure for an aircraft. A composite male fastener component is positioned through a pair of aircraft parts, the composite male fastener component having a shaft and a mechanical locking feature. A composite female fastener component is positioned around the shaft and adjacent to the threaded portion of the shaft while the composite male fastener component is positioned through the pair of aircraft parts, wherein the composite female fastener component comprises carbon fiber and resin and has a cylindrical shape. Heat and force is applied to the composite female fastener component to cause a portion of the composite female fastener component to melt and flow into the mechanical locking feature. The heat and force is removed such that the portion of the composite female fastener component that melted collar re-solidifies, wherein the composite female fastener component is attached to the composite male fastener component and the pair of mating aircraft parts are mechanically joined to each other.

In another advantageous embodiment, a method is used to attaching parts. A composite male fastener component is placed through a first part and a second part, the composite male fastener component having a mechanical locking feature. A composite female fastener component is positioned adjacent to the threaded portion. A portion of the composite female fastener component is caused to flow around the mechanical locking feature of the composite male fastener component. The portion of the composite female fastener component that flowed around the threaded portion of the composite male fastener component is solidified such that the composite female fastener component is attached to the composite male fastener component.

In yet another advantageous embodiment, a composite aircraft structure comprises a first composite aircraft part, a second composite aircraft part, a composite male fastener component, and a composite female fastener component. The composite male fastener component is placed through the first composite aircraft part and the second composite aircraft part, wherein the composite male fastener has a mechanical locking feature. The composite female fastener component is attached to the composite male fastener component through processing composite female fastener component in a manner that caused a portion of the composite female fastener component to flow around the mechanical locking feature of the composite male fastener component and re-solidify around the threaded section to join the composite female fastener component to the composite male fastener component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
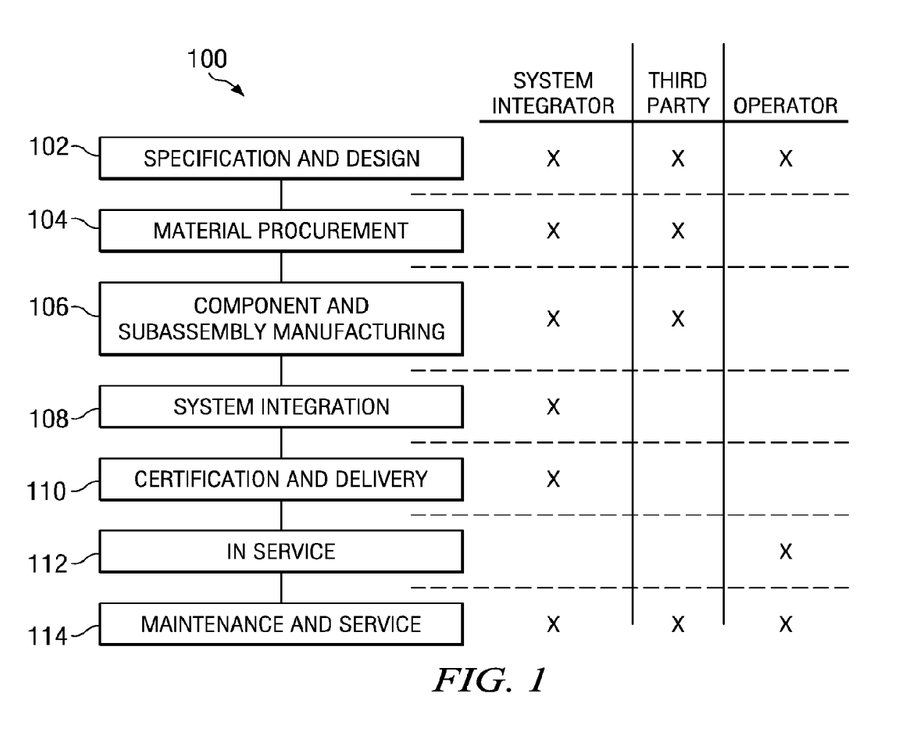
FIG. 1 is a description of an aircraft manufacturing and service method in which an advantageous embodiment may be implemented.
Figure 2:
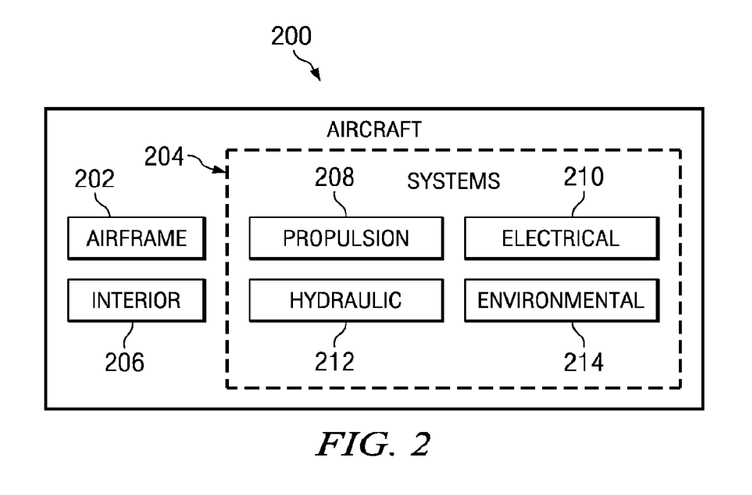
FIG. 2 is a description of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. During pre-production, aircraft manufacturing and service method 100 in FIG. 1 may include specification and design 102 of aircraft 200 in FIG. 2 and material procurement 104. During production, component and sub-assembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator as indicated by the "X" in the grid to the right of the flow diagram of FIG. 1. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 2, aircraft 200, produced by aircraft manufacturing and service method 100 in FIG. 1, may include airframe 202 with plurality of systems 204 and interior 206. Examples of systems 204 include one or more of propulsion system 208, electrical system 210, hydraulic system 212, environmental system 214, and airframe system 216.

Apparatus and methods embodied herein may be employed during any one or more of the stages of production and aircraft manufacturing and service method 100 in FIG. 1. For example, components or subassemblies provided in sub-assembly manufacturing 106 may be fabricated or manufactured in a manner similar to components or sub-assemblies produced while aircraft 200 is in service. Also, one or more apparatus embodiments, method embodiments, or a combination thereof may be utilized during production stages for component and sub-assembly manufacturing 106 and system integration 108 in FIG. 1, for example, by reducing the weight of aircraft 200. For example, the composite fastener system in the advantageous embodiments may be used in assembling structural and other composite components in aircraft 200. The use of these composite fastening systems reduces the weight of while improving the overall operating performance of aircraft 200. These additional weight savings may aid in increasing fuel savings and increasing payload capacity for aircraft 200.

The different advantageous embodiments provide a method and apparatus for attaching airframe components or parts to each other. In particular, the different advantageous embodiments may be used to assemble a composite structure for a product, such as an aircraft. A composite male fastener component is passed through at least a first part and a second part. This composite male fastener component has preferably a threaded portion. A composite female fastener component is positioned adjacent to and surrounding the threaded portion of the composite male fastener component.

A portion of the composite female fastening component may be caused to flow around or form into the threaded portion of the composite male fastener component. The portion of the composite female fastener component that flowed around or formed into the threaded portion of the composite male fastener component is re-solidified or re-consolidated such that the composite female fastener component is securely attached to the composite male fastener component. The portion of the female fastener component that flowed around or formed into the threaded portion of the composite male fastener component is preferably initiated by applying heat.

Heat is applied to the composite female fastener component to cause a portion of the composite female fastener component to flow around or form into the threaded portion of the composite male fastener component. In this example, the composite female fastener component is then cooled, causing the composite female fastener component to re-solidify or re-consolidate such that the composite female fastener component is attached or secured to the composite male fastener component.

In addition to applying heat to the composite female fastener component, pressure or force is preferably applied to the composite female fastener component to cause portions of the composite female fastener component to flow around or form into the threaded portion of the composite male fastener component. This type of assembly process may be employed during any state of manufacturing, maintenance, or repair to securely attach any type of parts or components to each other. In these examples, the parts or components attached or joined together using the composite male fastener component and the composite female fastener component are composite parts. In particular, these may be parts for an aircraft structure, such as a frame, stiffener, or wing skin, etc.

Figure 3:
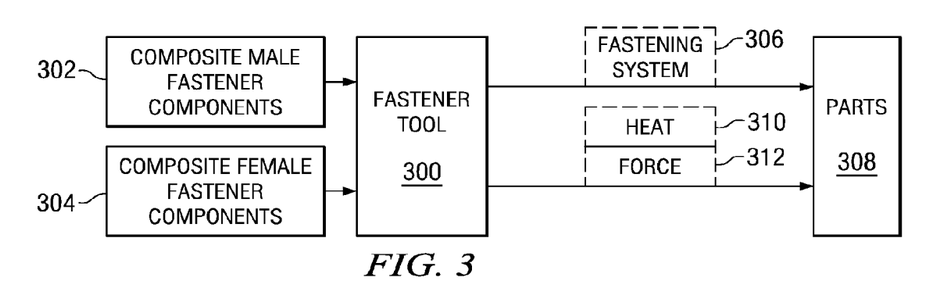
FIG. 3 is a diagram illustrating a system for fastening parts in accordance with an advantageous embodiment.

Turning next to FIG. 3, a diagram illustrating a system for fastening parts is depicted in accordance with an advantageous embodiment. In this example, fastener assembly tool 300 retrieves a composite male fastener component from composite male fastener components 302 and a composite female fastener component from composite female fastener components 304 to form fastening system 306. Fastening system 306 is applied to mating parts 308 as part of the process of mechanically attaching or joining parts 308 to each other. In these examples, parts 308 may be two or more parts, depending on the particular implementation. Further, parts 308 may be composite parts or components used in a product, such as an aircraft.

The composite male fastener component portion of fastening system 306 is placed through parts 308. The composite female fastener component of fastening system 306 is placed around and adjacent to the preferably threaded portion of the composite male fastener component. In the advantageous embodiments, when fastening system 306 is in place with mating parts 308, heat 310 and force 312 are applied to the composite female fastener component by fastener assembly tool 300. The heat and force applied by fastener assembly tool 300 causes a portion of the composite female fastener component to flow around or form into the threaded portion of the composite male fastener component. Thereafter, the assembled fastening system, fastening system 306, is allowed to cool. This cooling results in the composite female fastener component re-consolidating or re-solidifying in a manner that the composite female fastener component is securely attached to the composite male fastener component. In this manner, parts 308 are mechanically fastened or joined to each other.

In these examples, the composite male fastener component may be a lockbolt, a threaded pin, or some other shaped component containing a shaft in which part of the shaft has concentric grooves or a threaded section. The composite female fastener component may take various forms including, for example, a mating collar, a swage collar, or even a threaded nut. In some cases, the composite female fastener component may not include a mechanical locking feature, while the composite male fastener component does. The reverse also may occur for other embodiments. When in the form of a threaded nut, the composite female fastener component also includes a threaded section that interacts or engages with the threaded section of the composite male fastener component. In other embodiments, the composite female fastener component may simply have a cylindrical surface, (external, internal, or both) that may be placed around a threaded portion of the composite male fastener component.

Fastener assembly tool 300, in these examples, may take various forms. For example, fastener assembly tool 300 may be a hand tool in which fastening system 306 is put into position and place through mating parts 308 by hand. In this type of example, fastener assembly tool 300 provides heat 310 and force 312 to cause re-shaping or re-forming of composite materials within the composite female fastener component. In other examples, fastener assembly tool 300 may be an automated or robotic-type system in which the fastener assembly tool 300 contains or retrieves a supply of fastener components, such as composite male fastener components 302 and composite female fastener components 304 to form multiple fastening systems, such as fastening system 306 to attach mating parts 308 to each other.

Figure 4:
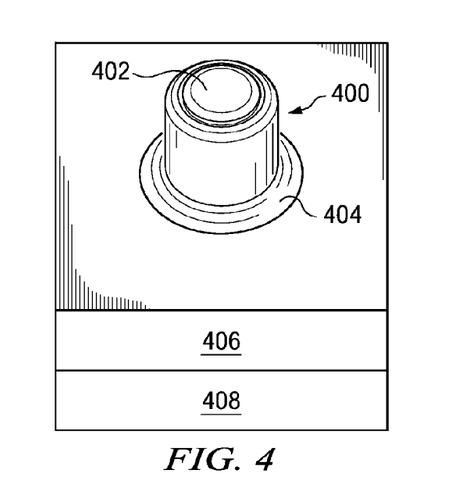
FIG. 4 is a diagram illustrating a fastening system in accordance with an advantageous embodiment.

Turning now to FIG. 4, a diagram illustrating a fastening system is depicted in accordance with an advantageous embodiment. In this example, fastening system 400 is an example of a fastening system, such as fastening system 306 in FIG. 3. Fastening system 400 includes composite male fastener component 402 and composite female fastener component 404, which has a substantially cylindrical shape. Composite male fastener component 402 slides through channels in components 406 and 408, and then into a channel within female fastener component 404. In this example, fastening system 400 is used to join components 406 and 408 to each other.

Figure 5:
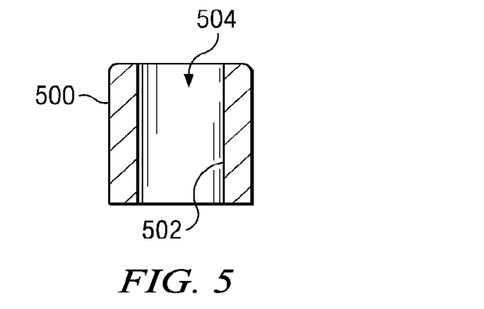
FIG. 5 is a cross-sectional view of a composite female fastener component in accordance with an advantageous embodiment.

With reference next to FIG. 5, a cross-sectional view of a composite female fastener component is depicted in accordance with an advantageous embodiment. In this example, composite female fastener component 500 has a cylindrical shape that is viewed in a cross-section. Composite female fastener component 500 includes inner surface 502, which forms channel 504 through which a composite male fastener component may be received. In this example, inner surface 502 is a substantially smooth surface.

Figure 6:
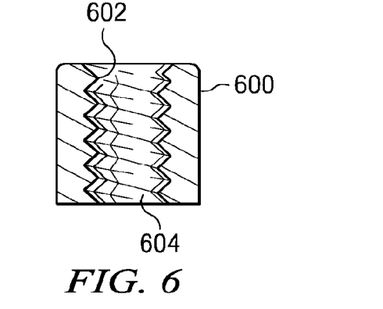
FIG. 6 is a cross-sectional view of a composite female fastener component in accordance with an advantageous embodiment.

Turning next to FIG. 6, a cross-sectional view of a composite female fastener component is depicted in accordance with an advantageous embodiment. In this example, composite female fastener component 600 has inner surface 602, which forms channel 604 through which a composite male fastener component may be received. In this example, inner surface 602 has a threaded section.

Figure 7:
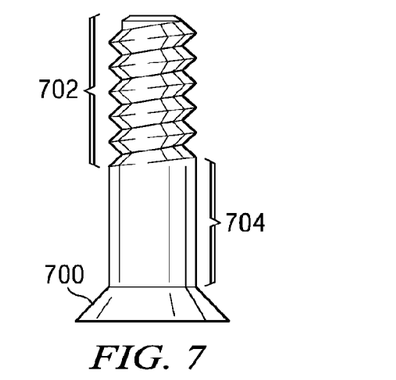
FIG. 7 is a cross-sectional view of a composite male fastener component in accordance with an advantageous embodiment.

Turning now to FIG. 7, a cross-sectional view of a composite male fastener component is depicted in accordance with an advantageous embodiment. In this example, composite male fastener component 700 has an elongate member with threaded section 702, which may be placed into a channel in a composite female fastener component. In this example, section 704 of composite male fastener component 700 may extend through two or more composite parts that are to be joined to each other using the fastening system in the different illustrative examples.

Figure 8:
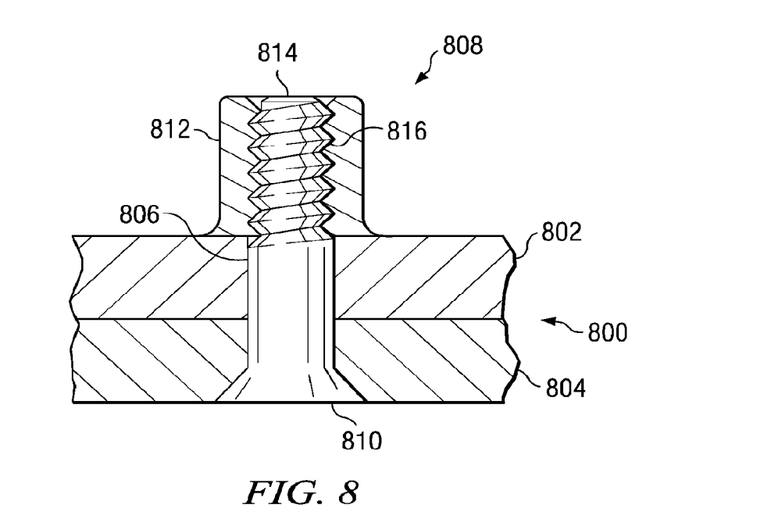
FIG. 8 is a cross-sectional view of a structure assembled using a fastening system in accordance with an advantageous embodiment.

With reference now to FIG. 8, a cross-sectional view of a structure assembled using a fastening system is depicted in accordance with an advantageous embodiment. In this example, structure 800 is a composite structure for an aircraft that is assembled using parts 802 and 804. These parts are attached to each other using fastening system 808.

In these examples, fastening system 808 is comprised of composite male fastener component 810 and composite female fastener component 812. In particular, composite male fastener component 810 is preferably a threaded pin, and composite female fastening component 812 is a swage or 'form' collar. As can be seen, composite male fastener component 810 contains threaded section 814. In the depicted examples, the composite male fastener component may be any elongate number that has a threaded portion. Of course, the threaded portion may only encompass part or the entire elongate number. Composite male fastener component 810 has been placed through hole 806, which is present or drilled through mating parts 802 and 804.

Composite female fastener component 812 includes inner surface 816 which has been placed over or positioned around threaded section 814 in composite male fastener component 810. This positioning of composite female fastener component 812 is an example of how composite female fastener component 812 may be placed or positioned adjacent to threaded section 814 in composite male fastener component 810.

In this particular advantageous embodiment, heat and force has been applied to composite female fastener component 812 such that at least a portion of this component flows around and forms into threaded section 814. In particular, the composite material along inner surface 816 of composite female fastener component 812 has flowed around and formed into threaded section 814. Of course, any process that may cause or result in composite material along inner surface 816 to re-melt and flow or form may be employed in addition to or in place of heat and/or force. For example, an electron beam or laser may be used to heat or cause inner surface 816 of composite female fastener component 812 to flow and re-form.

Composite female fastener component 812 has been allowed to cool such that composite female fastener component 812 re-consolidates or re-solidifies around and/or in threaded section 814 in such a manner that attaches or connects composite female fastener component 812 to composite male fastener component 810. With this type of attachment, parts 802 and 804 are now mechanically attached and joined to each other.

In these examples, the materials for composite female fastener component 812 are selected such that this component may be re-heated or re-melted at a later point to cause or result in the portions of composite female fastener component 812 around threaded section 814 to flow or form in a manner to allow composite female fastener component 812 to be removed or detached from composite male fastener component 810. In this manner, parts 802 and 804 may be taken apart from each other and disassembled. Such a removal or disassembly of fastening system 808 may be required for repair or replacement, depending on the particular structure. Of course, materials may be selected such that once cured, composite female fastener component 812 cannot be removed from composite male fastener component 810.

In these examples, different types of resins may be used in the composite materials that form the composite male fastener component and the composite female fastener component. On one hand, thermoset polymeric resins may be used, which becomes permanently hard when heated and will not soften again upon re-heating. On the other hand, a thermoplastic polymeric resin may be used, which can be melted and re-melted multiple times when re-heated. This latter type of resin is used in the advantageous embodiments illustrated in the different figures.

Thermoplastic polymeric resins typically have shorter processing times than thermoset polymeric resins. Further, these types of composite materials may be re-heated and re-formed repeatedly if required. This type of feature allows for the fastening system to be taken apart if needed.

Examples of thermoplastic polymeric resin materials that may be used to include, for examples, without limitation, liquid-crystal polymers (LCP); fluoroplastics, including polytetrafluoroethylene (PTFE), fluorinated ethylene propylene (FEP), perfluoroalkoxy resin (PFA), and polychlorotrifluoroethylene (PCTFE), and polytetrafluoroethylene-perfluoromethylvinylether (MFA™); ketone-based resins, including polyetheretherketone (PEEK™); polyamides (for example nylon-6/6, 30 percent glass fiber); polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); poly(phenylene sulfides) (PPS).

A thermoset polymeric resin is a resin that does not readily re-melt or re-flow after the initial cure. Still, this type of composite resin material also may be used, depending on the particular implementation. Examples of thermoset polymeric resin materials include, for example, without limitation, allyl polymers, alkyd polyesters, bismaleimides (BMI), epoxies, phenolic resins, polyesters, polyurethanes (PUR), and polyurea-formaldehydes.

Of course, any type of material may be used depending on the various properties and the desired uses. An example of one type of thermoplastic polymeric resin, used in the illustrative examples, is aromatic polyetheretherketone. This type of material is also referred to as a PEEK™ polymer. PEEK™ is a trademark of Victrex, Plc. This type of composite material is desirable for use in the different composite fastening systems illustrated in these examples because this type of material provides extremely good chemical resistance, abrasion resistance, high temperature resistance, hydraulics resistance, flame resistance with low smoke and toxic gasses, along with excellent electrical properties and excellent resistance to gamma rays.

Further, in these examples, the composite materials employ short-fiber reinforced composites. A short-fiber is considered a composite with about twenty percent to about twenty-five percent volume fiber content. The use of this type of fiber reduces problems of fiber orientation and breakage that may occur with longer fiber composites. Of course, long-fiber reinforced composites also may be used depending on the type of fibers. A long-fiber is considered, in these examples, a composite that uses about fifty percent to about sixty percent content of glass, aramid, or carbon fibers. Other examples of materials that may be used in the composite fastening system, in these examples, are glass, carbon, or titanate fibers, which may be compounded or mixed into the thermoset polymer. These types of fibers may be used at levels of about up to thirty percent. Use of these types of fibers may improve stress cracking, cut through resistance, dimensional stability, creep, warpage, heat deflection, tensile strength, and flex modulus.

An additional feature that may be implemented in the composite fastening system, in these examples, is to 'pre-treat' or 'pre-coat' the composite fastener components. The composite male fastener component and the composite female fastener component may be 'pre-treated' or 'pre-coated' with an organic coating that improves the compatibility of these components with other dissimilar composite and metallic materials. With this improved compatibility, the assembled structures with the pre-coated composite components typically exhibit reduced issues relating to composite delamination, water intrusion, electrical continuity of the component, arcing between components, galvanic corrosion, fuel tightness, and surface lubricity allowing relative movement due to differential expansion of the components in the structure.

Figure 9:
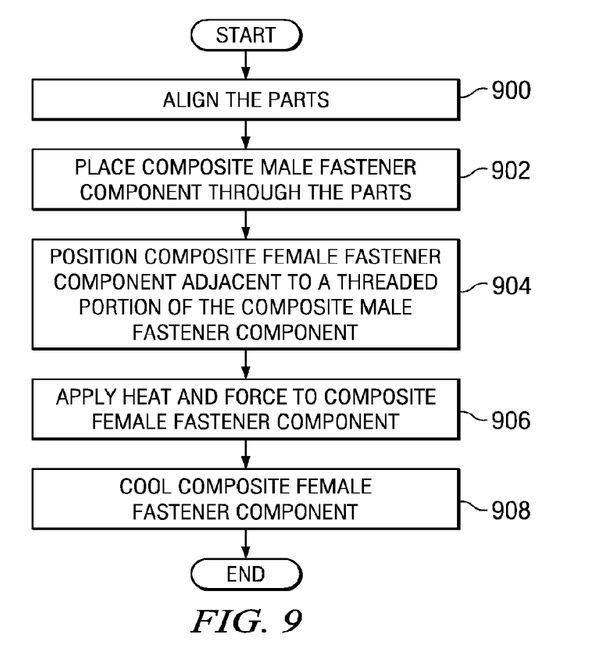
FIG. 9 is a flowchart of a process for attaching parts or assembling a structure in accordance with an advantageous embodiment.

With reference now to FIG. 9, a flowchart of a process for attaching or joining parts or assembling a structure is depicted in accordance with an advantageous embodiment. In this example, the process illustrated in FIG. 9 may be implemented using fastener assembly tool 300 in FIG. 3.

The process begins by aligning the parts (operation 900). In these examples, the parts may be aligned by placing the parts in the proper positions with respect to each other for mechanical attachment. Then the channel or hole may be drilled or formed through the parts to allow for a composite male fastener component to be passed or inserted through the channel or hole. Depending on the particular implementation, these parts may have the holes or channel pre-drilled or pre-formed with the holes or channels being aligned with each other. Next, a composite male fastener component is placed through the aligned and adjacent parts (operation 902). Operation 902 is performed by passing the composite male fastener component through the hole or channel that passes through the aligned and adjacent parts.

Next, a composite female fastener component is positioned adjacent to and over a threaded portion of the composite male fastener component (operation 904). The composite female fastener component is placed or positioned adjacent to or over the threaded section of the composite male fastener component by positioning the composite female fastener component in a manner such that an inner surface or portion of the composite female fastener component is adjacent to the threaded section(s).

Thereafter, heat and force are applied to the composite female fastener component (operation 906). In the examples, the fastener assembly tool may be heated to approximately 600° F. to 700° F. at a minimum, with about 100 pounds to about 300 pounds of force being applied for at least about 15 to about 30 seconds. These parameters are present for purposes of illustrating one embodiment. The temperature, force, and time used may vary depending on the fastening system being used in other embodiments. Depending on the particular implementation, only heat may be applied to the composite female fastener component. Operation 906 is intended to cause a portion of the composite female fastener component to flow around or form into the threaded portions of the composite male fastener component. Although heat and force are illustrated as the techniques used to cause the portion of the composite female fastener component to flow around or form into the threaded portion(s), other mechanisms may be used. For example, an electron beam or laser process may be used to cause the portion of the composite female fastener component to flow or form.

Next, the composite female fastener component is cooled (operation 908) with the process terminating thereafter. This cooling of the composite female fastener component may occur by removing the heat source that was applying heat to this component. In other examples, the composite fastener component may actually be cooled with a cooling system. Operations 906 and 908 are performed as part of a curing step or process for the composite fastening system that causes the composite female fastener component to be attached or joined to the composite male fastener component.

Figure 10:
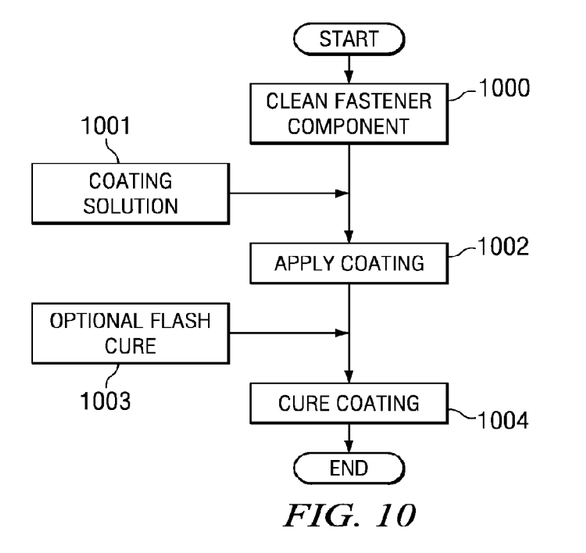
FIG. 10 is a flowchart of a process for pre-treating a fastening system in accordance with an advantageous embodiment.

Turning now to FIG. 10, a flowchart of a process for pretreating components of a fastening system is depicted in accordance with an advantageous embodiment. The process illustrated in FIG. 10 may be applied to components of a composite fastening system prior to the use of the fastening system to mechanically attach or join parts to each other.

The process begins by cleaning the fastener components (operation 900). In this operation, the cleaning may be performed to remove oils or other contaminants from the surface of the composite components. By removing oils and other contaminants, mechanical bonding of the coating to the fastener may be increased. The process applies coating solution 1001 to the fastener components (operation 1002). The coating solution is a coating material in a solution. In operation 1002, a coating material is provided, preferably in solution, so that it may be readily and evenly applied to the components. The usual function of the coating material is to protect the base material, to which it is applied from corrosion activity, including, for example, conventional electrolytic corrosion, galvanic corrosion, and stress corrosion. In these examples, the coating material is a formulation that is primarily of an organic composition, but which may contain additives to improve the properties of the final coating. In one embodiment, the coating is initially dissolved in a carrier liquid so that it can be applied to a substrate.

Any suitable coating approach, such as dipping, spraying, brushing, or a fluidized bed method can be used. In the preferred approach, the solution of coating material dissolved in solvent is sprayed onto the component precursor.

A typical sprayable coating solution preferably has about 30 percent by weight ethanol, about 7 percent by weight toluene, about 45 percent by weight methyl ethyl ketone (MEK) as the solvent; and about 2 percent by weight strontium chromate, about 2 percent by weight aluminum powder, with the balance being mixed with phenolic resin and at least one plasticizer. A small amount of polytetrafluoroethylene may optionally be added. Such a product is available commercially under the name, Hi-Kote 1™ from Lisi Aerospace-Hi-Shear Corp., Torrance, Calif. This product has a standard elevated temperature curing treatment of one hour at +425 degrees, +/−25 degrees, as recommended by the manufacturer. The Hi-Kote 1™ coating and other similar coatings are described in commonly assigned U.S. Pat. Nos. 5,614,037, 5,858,133, 5,922,472, and 5,944,918, the contents of which are incorporated herein by reference to the extent they do not conflict with the explicit text of this specification.

The coating material is preferably provided in solution so as to be evenly applied. The coating material preferably is a formulation that is primarily of an organic nature but may also contain additives to improve the properties of the final coating. By way of example, a Teflon™ compound may be added to improve coating lubricity, which allows for reduced insertion force requirements, better hole fill, and improved sheet take-up. By way of another example, aluminum powder pigment may be added to improve overall coating material integrity. The coating is desirably dissolved initially in a carrier liquid to facilitate various methods of deposition on a substrate.

According to one embodiment, the outer surface of the composite fastener component is soap cleaned and dried (i.e., degreased) prior to application of the coating. Degreasing cleans the composite surface of oils or other contaminants that may be present upon the outer surface of the fastener component. Degreasing increases the mechanical bonding of the coating to surface of the fastener component. The coatings in the advantageous embodiments are internally coherent and are uniformly deposited at a preferred thickness range from about 0.0003 inches to about 0.0005 inches, though the coating may have other thicknesses if desired.

Thereafter, the fastener components with the applied coating are thermally-treated to cure the coating (operation 1004), with the process terminating thereafter and with the components becoming ready for use.

The curing operation is employed to effect structural changes within the organic component, typically cross-linking of the organic molecules to improve the adhesion and cohesion of the coating.

Optionally, before curing in operation 1004, the majority of solvent in the coating solution may be removed from the as-applied coating by drying or "flash cure" 1003, either at room temperature or slightly elevated temperature, so that the coated article or component is dry to the touch. Flash cure or drying may be achieved at about 200 degrees for about one to two minutes and accomplishes evaporation of the majority of solvent, allowing the coated article or component to be handled without altering or damaging the coating layer.

The coated component may still not be suitable for service after drying or flash cure because the coating may not have sufficiently cured and adhered to the surface of the composite component and because the coating itself is not sufficiently coherent or cross-linked to resist corrosion activity or mechanical damage during installation or subsequent service.

A number of curable, organic coating materials are available and operable in the present process. More specifically, the coating material may be any of a wide variety of curable organic coating materials having aromatic resins, such as phenolics, polyamides, and polybenoxazoles. The resin or resins are preferably mixed with one or more plasticizers, other organic components such as polytetrafluoroethylene, and inorganic additives such as aluminum powder and/or strontium chromate or other corrosion-inhibiting additives. These coating compounds are preferably dissolved in a suitable solvent present in an amount to produce a desired application consistency. For polyaromatic resins, generally the solvent is advantageously a mixture of ethanol, toluene, and methyl ethyl ketone (MEK).

To fully cure the coating, in these examples, the coating is heated to and maintained above the curing temperature of the coating material as described in operation 1004. With this recommended "full-up" or full-curing process, cure time will vary with the coating material used and the associated cure temperature selected. Typical cure temperatures range from about +250 degrees to about +450° F., and typical cure times range from about one hour to about four hours, not respective, and more typically from about +400 degrees to about +450 degrees for about 1 to about 1.5 hours, not respective. It is understood that the term "pre-coated" or "pre-coating" refers to the coating process of the fastener component prior to installation and assembly in its final use.

In the case of the Hi-Kote 1™ coating, a flash cure temperature of +200 degrees for one to two minutes or full cure temperature of +425 degrees for approximately one hour are exemplary. The majority of the solvent portion of the coating is removed by a "flash-cure" drying process at a slightly elevated temperature of +200 degrees for one to two minutes. Flash curing volatizes the volatile portion of the coating solvent and allows handling of the coated fastener prior to full curing.

The coatings of the present invention are internally coherent and are uniformly deposited at a preferred thickness range from about 0.0003 inch to about 0.0005 inch, though the coating may have other thicknesses if desired. Surprisingly, it has been demonstrated through testing that the coating deposited onto a rivet-type fastener, and subsequently cured, is able to withstand the installation forces placed upon the pre-coated rivet during upset. For example, the pre-coated fastener components of one embodiment of the present invention meet required ultimate double shear strength requirements useful in aircraft primary structural applications. Specifically, the fasteners of this embodiment must meet the ultimate shear strength requirements for uncoated rivets of a minimum of 34,500 lbs./in$^2$ while exhibiting no perceptible impact on the coating integrity even if the protruding shanks of the rivets are expanded during installation to a diameter of about 1.6 times their initial diameters.

Actual test results from double shear tests surprisingly indicated that the pre-coated composite rivets did in fact conform to the requirements established by the uncoated composite rivets. Specifically, the ultimate shear strength values ranged from 34,900 lbs./in$^2$ to 40,400 lbs./in$^2$ with an average of 37,400 lbs./in$^2$. No evidence of spalling or other unsatisfactory conditions regarding the coating adherence was evident upon inspection of the rivet upsets after installations.

The description of the different advantageous embodiments has been presented for purposes of illustration and description and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A composite aircraft structure comprising:
a first composite aircraft part;
a second composite aircraft part;
a composite male fastener component placed through the first composite aircraft part and the second composite aircraft part, wherein the composite male fastener component comprises carbon fiber and resin without any woven, braided, or circumferentially directed fibers disposed about chopped fibers and has a mechanical locking feature; and
a composite female fastener component attached to the composite male fastener component wherein the composite female faster component comprises carbon fiber and resin without any woven, braided, or circumferential directed fibers disposed about chopped fibers and a portion of the composite female fastener component engages the mechanical locking feature of the composite male fastener component when an application of heat and force causes the portion to flow around the mechanical locking feature and to re-solidify around the mechanical locking feature of the composite male fastener component to join the composite female fastener component to the composite male fastener component.

2. The composite aircraft structure of claim 1, wherein the first composite aircraft part and the second composite aircraft part are part of a wing for an aircraft.

3. The composite aircraft structure of claim 1, wherein the first composite aircraft part and the second composite aircraft part are structural components in an aircraft.

4. The composite aircraft structure of claim 1, wherein the mechanical locking feature of the composite male fastener component is selected from one of a threaded section and concentric grooves.

5. The composite aircraft structure of claim 1, wherein the mechanical locking feature of the composite male fastener component is a first threaded section and wherein the composite female fastener component has a second threaded section on an inside portion of the composite female fastener component designed to mechanically interact with the first threaded section of the composite male fastener component.

6. The composite aircraft structure of claim 1, wherein the composite female fastener component is selected from one of a mating collar, a swag collar, and a threaded nut.

7. The composite aircraft structure of claim 1, wherein the composite male fastener component is selected from one of a lockbolt and a threaded pin.

8. The composite aircraft structure of claim 1, wherein the resin of the composite female fastener component is selected from one of a thermoplastic polymeric resin, a thermoset polymeric resin, a liquid-crystal polymer, a fluoroplastic, a polytetrafluoroethylene, a fluorinated ethylene propylene, a perfluoroalkoxy resin, a polychlorotrifluoroethylene, a polytetrafluoroethylene, a perfluoromethylvinylether, a ketone-based resin, a polyetheretherketone, a polyamide, a polyethersulfone, a polyamideimide, a polyethylene, a polyester thermoplastic, a polybutylene terephthalate, a polyethylene terephthalate, a poly(phenylene terephthalate), a polysulfone, a poly(phenylene sulfide), an allyl polymer, an alkyd polyester, a bismaleimide, an epoxy, a phenolic resin, a polyester, a polyurethane, and a polyurea-formaldehyde.

9. The composite aircraft structure of claim 1, wherein the fibers of the composite female fastener component are selected from one of glass fibers, aramid fibers, titanate fibers, and carbon fibers.

10. The composite aircraft structure of claim 1, wherein the composite material of the composite female fastener component comprises about a twenty percent to about a twenty-five percent volume fiber content.

11. The composite aircraft structure of claim 1, wherein the composite material of the composite female fastener component comprises about a fifty percent to about a sixty percent content of volume fiber content.

12. The composite aircraft structure of claim 1, wherein the composite male fastener component has a coating material.

13. The composite aircraft structure of claim 1, wherein the composite female fastener component has a coating material.

14. The composite aircraft structure of claim 13, wherein the coating material of the composite female fastener component is an organic coating material.

15. The composite aircraft structure of claim 14, wherein the organic coating material is selected from one of an aromatic resin, a phenolic, a polyamide, a polybenoxazole, and a polyaromatic resin.

16. The composite aircraft structure of claim 14, wherein the organic coating material has a thickness of about 0.0003 inches to about 0.0005 inches.

* * * * *